(12) United States Patent
Takeshita

(10) Patent No.: US 9,218,151 B2
(45) Date of Patent: Dec. 22, 2015

(54) INFORMATION PROCESSING DEVICE, IMAGE PROCESSING DEVICE, IMAGE PROCESSING SYSTEM, AND NON-TRANSITORY COMPUTER READABLE MEDIUM TO CONTROL EXECUTION OF IMAGE PROCESSING BASED ON RESOURCE INFORMATION

(71) Applicant: FUJI XEROX CO., LTD., Minato-ku, Tokyo (JP)

(72) Inventor: Yoshihiro Takeshita, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/450,678

(22) Filed: Aug. 4, 2014

(65) Prior Publication Data

US 2015/0193179 A1 Jul. 9, 2015

(30) Foreign Application Priority Data

Jan. 8, 2014 (JP) ................. 2014-002036

(51) Int. Cl.
*G06F 3/12* (2006.01)
*H04N 1/00* (2006.01)

(52) U.S. Cl.
CPC ............ *G06F 3/1292* (2013.01); *G06F 3/1204* (2013.01); *G06F 3/1253* (2013.01); *G06F 3/1256* (2013.01); *H04N 1/0035* (2013.01)

(58) Field of Classification Search
CPC ............................ G03G 15/553; G06F 3/1292

USPC ................... 358/1.15, 1.14; 399/24, 27, 8, 79
See application file for complete search history.

(56) References Cited

U.S. PATENT DOCUMENTS

| | | | |
|---|---|---|---|
| 2006/0080571 A1 | 4/2006 | Ichinowatari | |
| 2008/0267654 A1 | 10/2008 | Kawai | |
| 2011/0164886 A1* | 7/2011 | Sawada | ............................ 399/8 |
| 2012/0162700 A1 | 6/2012 | Miyazaki | |
| 2013/0013762 A1* | 1/2013 | Mori | ............................ 709/223 |

FOREIGN PATENT DOCUMENTS

| | | |
|---|---|---|
| JP | 2006-91343 A | 4/2006 |
| JP | 2008-124973 A | 5/2008 |
| JP | 2010-233253 A | 10/2010 |
| JP | 2012-137868 A | 7/2012 |

* cited by examiner

*Primary Examiner* — Jacky X Zheng
(74) *Attorney, Agent, or Firm* — Sughrue Mion, PLLC

(57) ABSTRACT

An information processing device includes a resource information acquisition unit and a controller unit. The resource information acquisition unit acquires first resource information and second resource information. The first resource information indicates resources used to execute predetermined image processing. The second resource information indicates resources held by an image processing device selected as a device that executes the image processing. The controller unit performs control to generate a screen on which an operation to execute the image processing is accepted in accordance with a resource corresponding to the second resource information among the resources included in the first resource information.

13 Claims, 16 Drawing Sheets

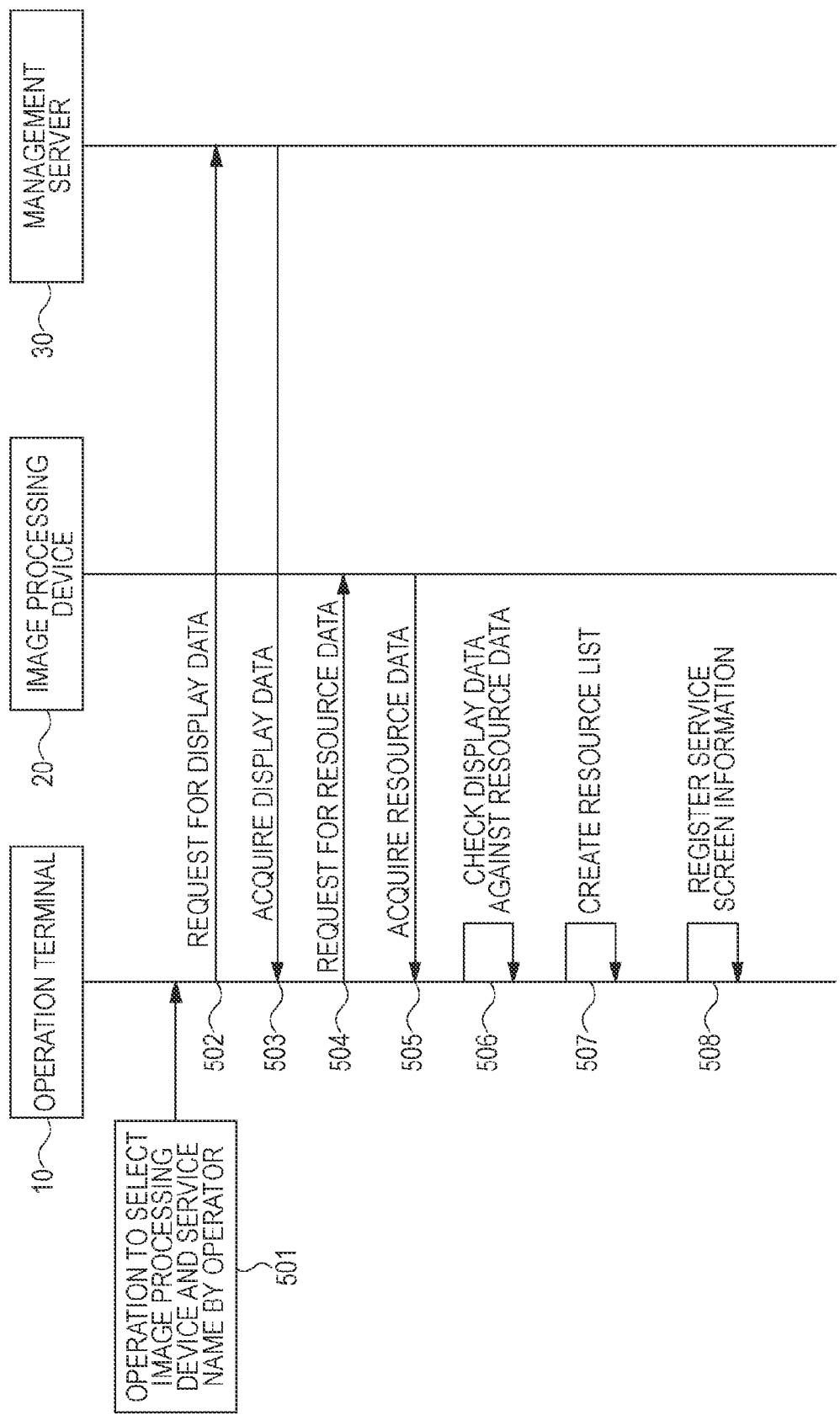

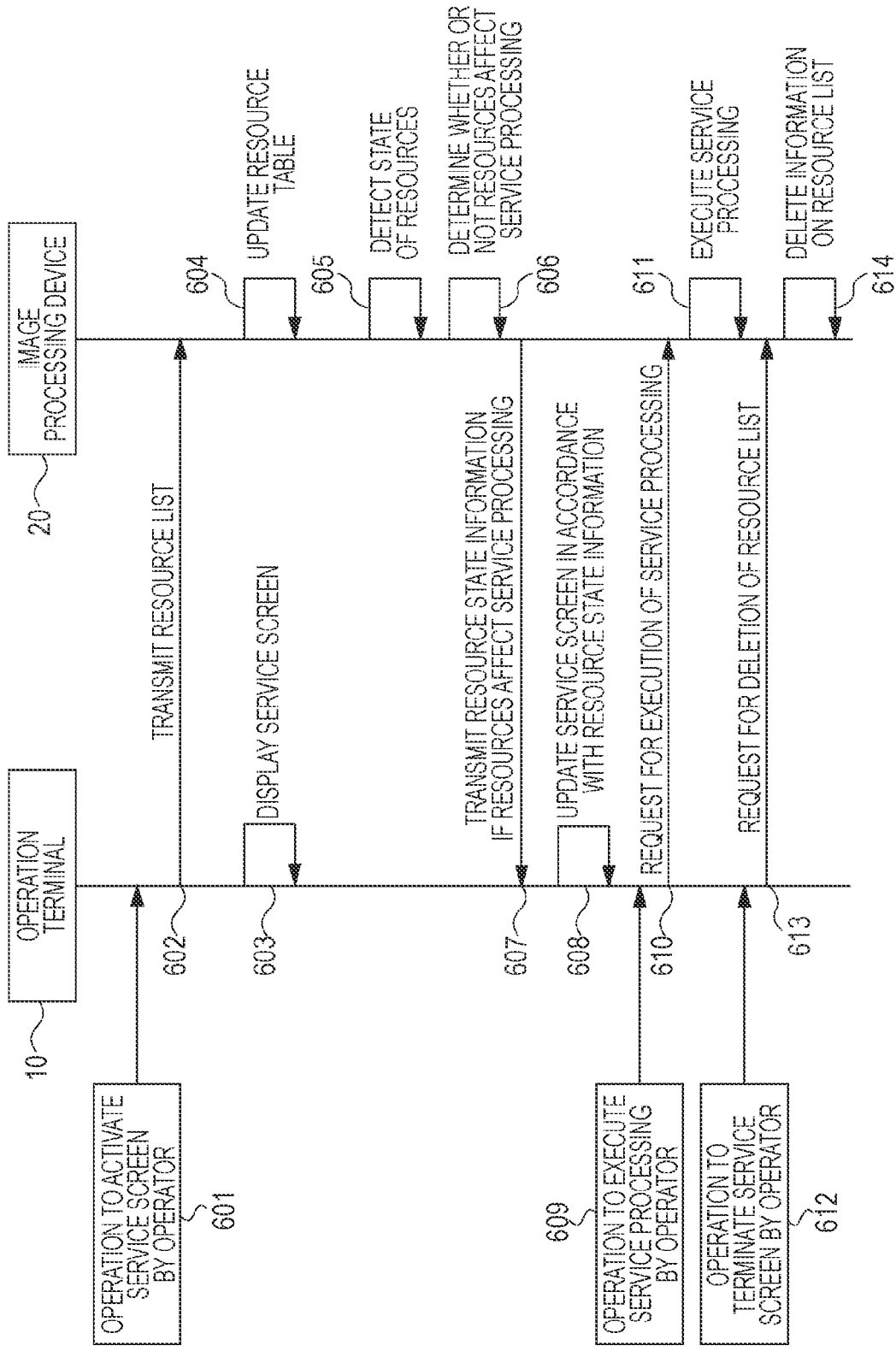

FIG. 7A

| |
|---|
| SCANNER INFORMATION<br>  RESOLUTION<br>  SCAN SIZE |
| PRINTING INFORMATION<br>  MONOCHROME PRINTING<br>  COLOR PRINTING<br>  SCALING PRINTING<br>  N-UP PRINTING |
| FACSIMILE INFORMATION<br>  FACSIMILE LINE |
| TONER INFORMATION (YMCK) |
| SHEET CONTAINER INFORMATION (A4, A5, B4, B5) |
| DESTINATION INFORMATION (FACSIMILE ADDRESS) |

FIG. 7B

| |
|---|
| SIMPLE COPYING (A4) |
| SCANNER INFORMATION<br>  SCAN SIZE (A4) |
| PRINTING INFORMATION<br>  COLOR PRINTING |
| TONER INFORMATION |
| SHEET CONTAINER INFORMATION (A4) |

FIG. 7C

| |
|---|
| STANDARD COPYING (A5) |
| SCANNER INFORMATION<br>  SCAN SIZE (A5) |
| PRINTING INFORMATION<br>  MONOCHROME PRINTING<br>  COLOR PRINTING (OPTIONAL)<br>  SCALING PRINTING (OPTIONAL)<br>  N-UP PRINTING (OPTIONAL) |
| TONER INFORMATION |
| SHEET CONTAINER INFORMATION (A5) |

FIG. 8A

[SELECTION OF IMAGE PROCESSING DEVICE]

1. IMAGE PROCESSING DEVICE 20A (IP = 11.22.33.01)

2. IMAGE PROCESSING DEVICE 20B (IP = 11.22.33.02)

FIG. 8B

[SELECTION OF SERVICE TO BE SET]
IMAGE PROCESSING DEVICE 20A (IP = 11.22.33.01)

1. SIMPLE COPYING (A4)

2. STANDARD COPYING (A5)

3. SIMPLE PRINTING

4. SIMPLE SCANNING

5. SIMPLE FACSIMILE

FIG. 8C

[SELECTION OF SERVICE TO BE EXECUTED]
IMAGE PROCESSING DEVICE 20A (IP = 11.22.33.01)

( SIMPLE COPYING (A4) )   ( STANDARD COPYING (A5) )

FIG. 9

| OPERATION TERMINAL | SERVICE NAME | RESOURCE INFORMATION |
|---|---|---|
| OPERATION TERMINAL 10A (IP= 11.22.33.11) | SIMPLE COPYING (A4) | SCANNER INFORMATION<br>  SCAN SIZE (A4) |
| | | PRINTING INFORMATION<br>  COLOR PRINTING |
| | | TONER INFORMATION (YMCK) |
| | | SHEET CONTAINER INFORMATION (A4) |
| OPERATION TERMINAL 10B (IP= 11.22.33.12) | STANDARD COPYING (A5) | SCANNER INFORMATION<br>  SCAN SIZE (A5) |
| | | PRINTING INFORMATION<br>  MONOCHROME PRINTING<br>  COLOR PRINTING (OPTIONAL)<br>  SCALING PRINTING (OPTIONAL)<br>  N-UP PRINTING (OPTIONAL) |
| | | TONER INFORMATION (YMCK) |
| | | SHEET CONTAINER INFORMATION (A5) |

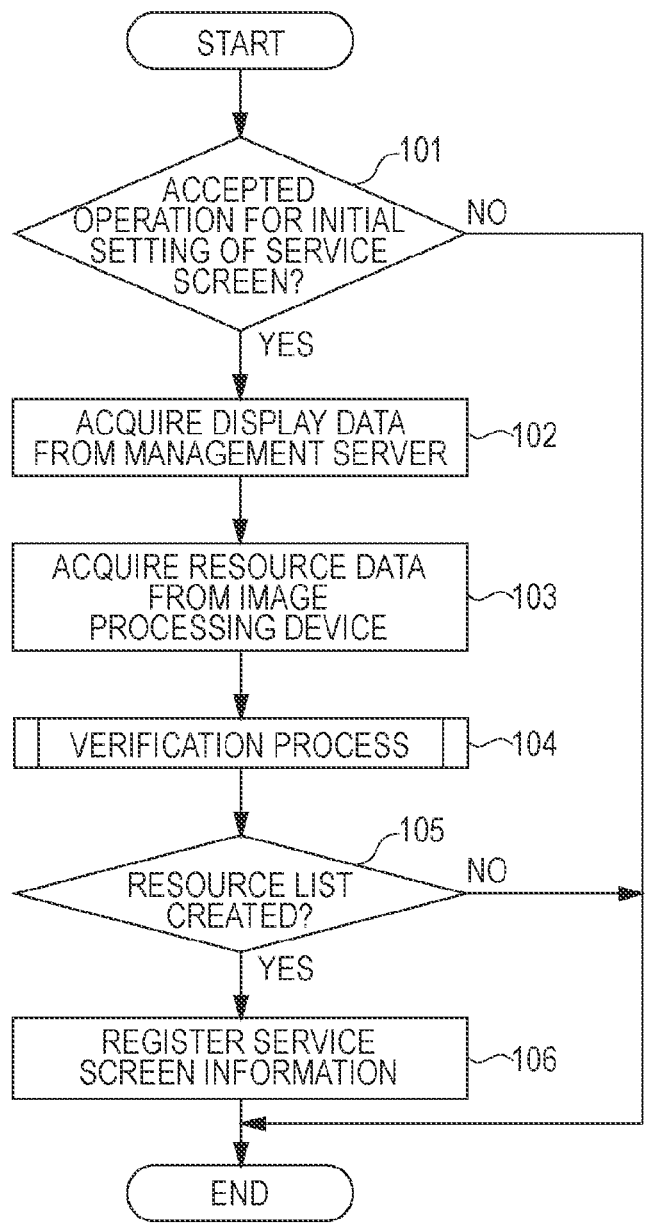

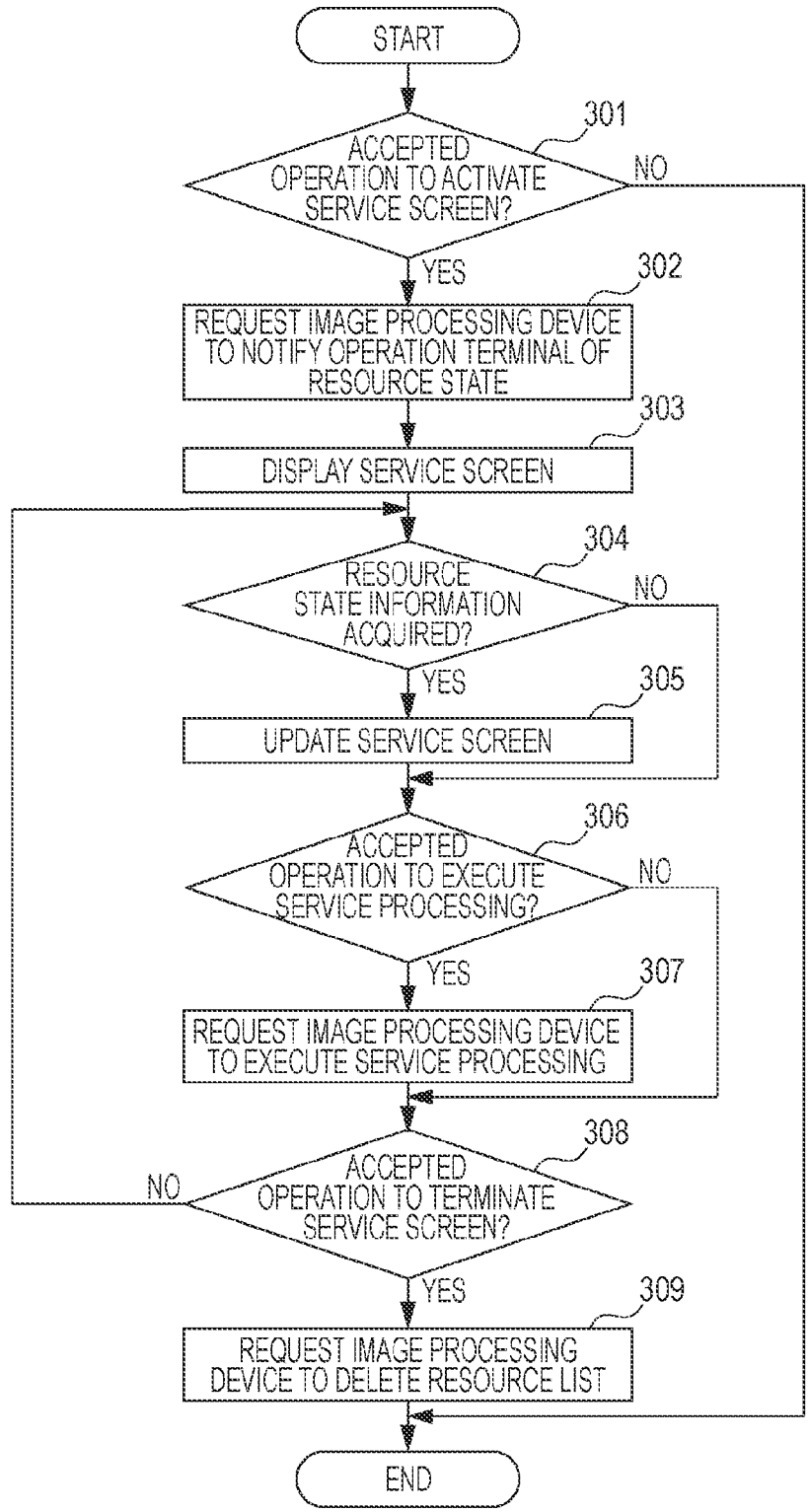

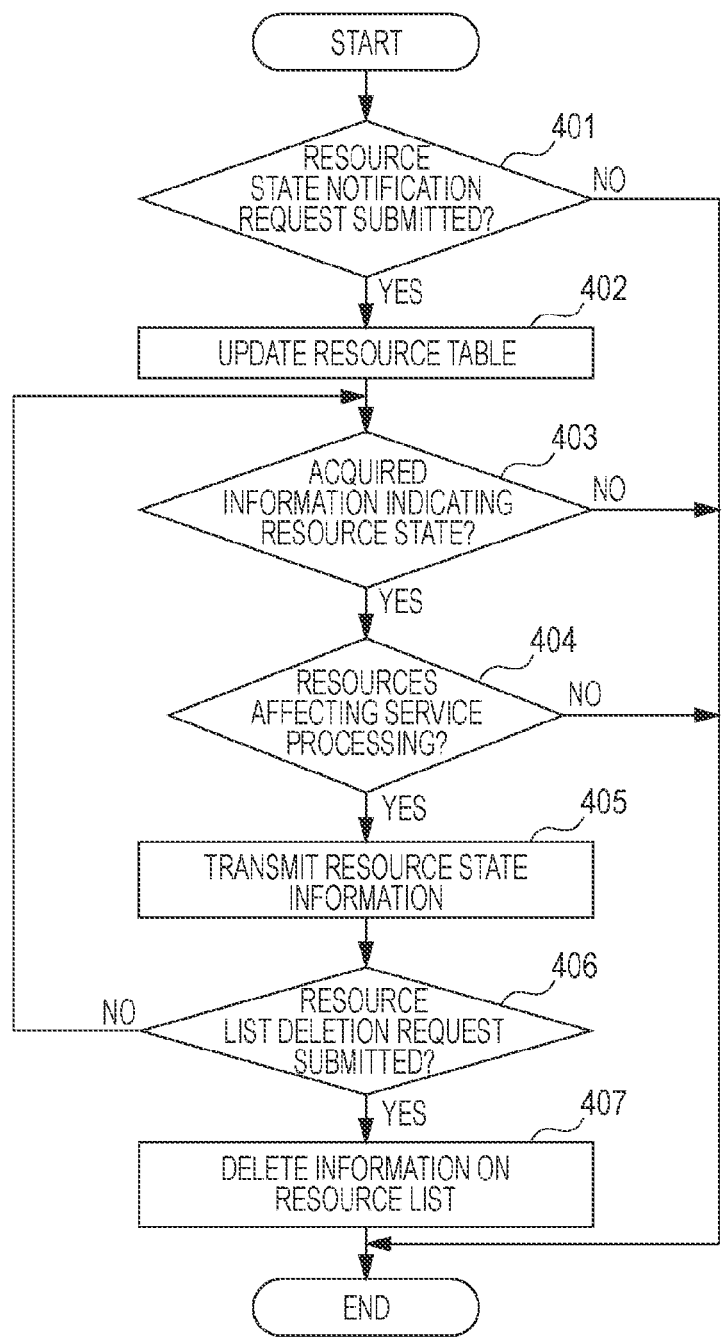

FIG. 14

| RESOURCE ITEMS | IMAGE PROCESSING DEVICE 20B | SIMPLE COPYING (A4) | STANDARD COPYING (A5) | SIMPLE FACSIMILE (A4) |
|---|---|---|---|---|
| SCANNER INFORMATION | YES | REQUIRED | REQUIRED | REQUIRED |
| RESOLUTION | YES | | | |
| SCAN SIZE | YES | REQUIRED | REQUIRED | REQUIRED |
| PRINTING INFORMATION | YES | REQUIRED | REQUIRED | |
| MONOCHROME PRINTING | YES | | REQUIRED | |
| COLOR PRINTING | YES | REQUIRED | OPTIONAL | |
| SCALING PRINTING | NO | | OPTIONAL | |
| N-UP PRINTING | YES | | OPTIONAL | |
| FACSIMILE INFORMATION | NO | | | REQUIRED |
| FACSIMILE LINE | NO | | | REQUIRED |
| TONER INFORMATION (YMCK) | YES | REQUIRED | REQUIRED | |
| SHEET CONTAINER INFORMATION (A4, A5, B4, B5) | YES | REQUIRED | REQUIRED | |
| DESTINATION INFORMATION (FACSIMILE ADDRESS) | NO | | | REQUIRED |

FIG. 15A

```
SIMPLE COPYING (A4)
  (IP: 11.22.33.02)

PAPER SIZE: A4

COLOR PRINTING

[ START COPY ]

THE SERVICE IS AVAILABLE
```

FIG. 15B

```
STANDARD COPYING (A5)
   (IP: 11.22.33.02)

PAPER SIZE: A5
MONOCHROME PRINTING
COLOR PRINTING
N-UP PRINTING
[ START COPY ]

THE SERVICE IS AVAILABLE
```

SIMPLE COPYING (A4)
(IP: 11.22.33.02)

PAPER SIZE: A4

COLOR PRINTING

THE SERVICE IS NOT AVAILABLE
(OUT OF A4 SIZE PAPER)

SIMPLE COPYING (A4)
(IP: 11.22.33.02)

PAPER SIZE: A4

COLOR PRINTING

THE SERVICE IS NOT AVAILABLE
(OUT OF M COLOR TONER)

INFORMATION PROCESSING DEVICE, IMAGE PROCESSING DEVICE, IMAGE PROCESSING SYSTEM, AND NON-TRANSITORY COMPUTER READABLE MEDIUM TO CONTROL EXECUTION OF IMAGE PROCESSING BASED ON RESOURCE INFORMATION

CROSS-REFERENCE TO RELATED APPLICATIONS

This application is based on and claims priority under 35 USC 119 from Japanese Patent Application No. 2014-002036 filed Jan. 8, 2014.

BACKGROUND

Technical Field

The present invention relates to an information processing device, an image processing device, an image processing system, and a non-transitory computer readable medium program.

SUMMARY

According to an aspect of the invention, there is provided an information processing device including a resource information acquisition unit and a controller unit. The resource information acquisition unit acquires first resource information and second resource information. The first resource information indicates resources used to execute predetermined image processing. The second resource information indicates resources held by an image processing device selected as a device that executes the image processing. The controller unit performs control to generate a screen on which an operation to execute the image processing is accepted in accordance with a resource corresponding to the second resource information among the resources included in the first resource information.

BRIEF DESCRIPTION OF THE DRAWINGS

Exemplary embodiments of the present invention will be described in detail based on the following figures, wherein:

FIG. 5 is a sequence diagram illustrating an example of a series of processes for the initial setting of a service screen;

FIG. 6 is a sequence diagram illustrating an example of a series of processes for the execution of service processing;

FIG. 7A illustrates an example of resource data;

FIGS. 7B and 7C illustrate an example of display data;

FIGS. 8A to 8C illustrate an example of screens displayed on a display unit;

FIG. 9 illustrates an example of a resource table stored in the image processing device;

FIG. 10 is a flowchart illustrating an example of a processing procedure performed by the operation terminal for the initial setting of a service screen;

FIG. 12 is a flowchart illustrating an example of a processing procedure performed by the operation terminal for the execution of service processing;

FIG. 13 is a flowchart illustrating an example of the procedure of a resource state information transmission process performed by the image processing device;

FIG. 14 illustrates an example of a relationship between resource data and display data;

FIGS. 15A and 15B illustrate an example of a service screen displayed on the display unit.

DETAILED DESCRIPTION

An exemplary embodiment of the present invention will be described in detail hereinafter with reference to the accompanying drawings.

System Configuration

Figure 1:
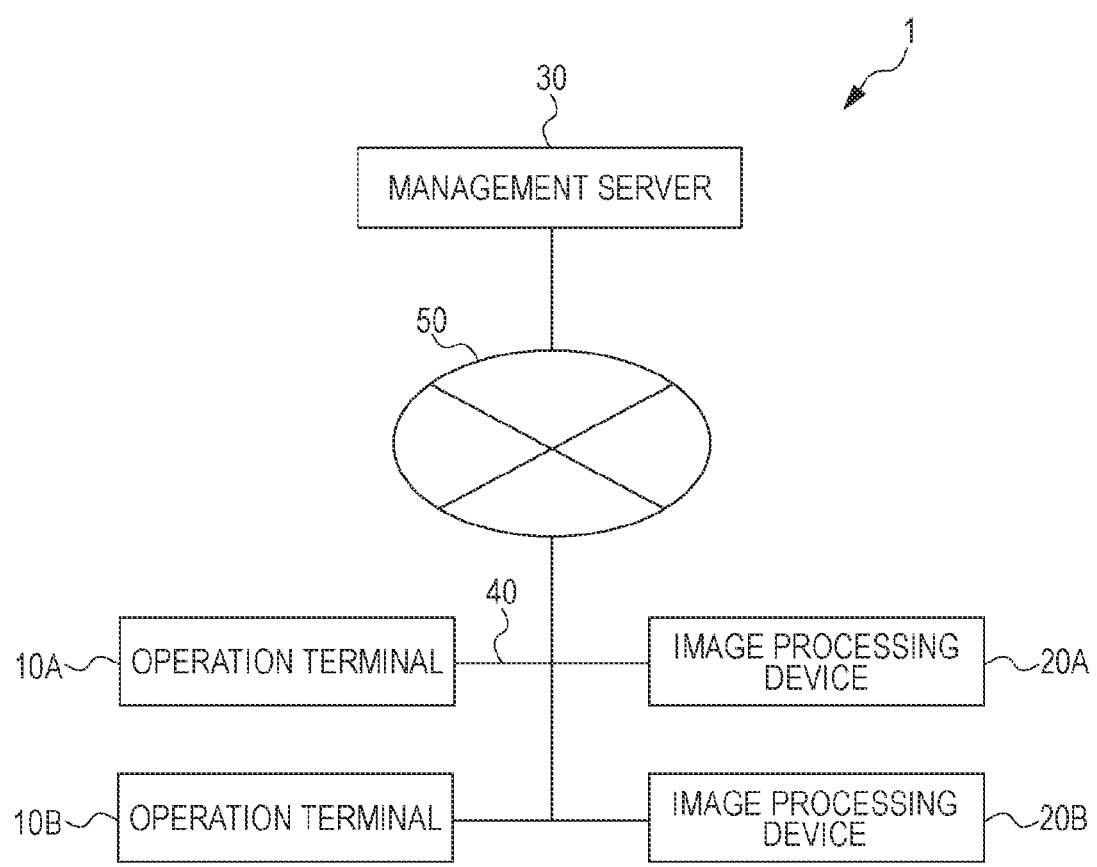
FIG. 1 illustrates an example of a schematic configuration of an image processing system according to an exemplary embodiment.

FIG. 1 illustrates an example of a schematic configuration of an image processing system 1 according to an exemplary embodiment. The image processing system 1 according to this exemplary embodiment includes an operation terminal 10A, an operation terminal 10B, an image processing device 20A, an image processing device 20B, and a management server 30. The operation terminal 10A and the operation terminal 10B are connected to the image processing device 20A and the image processing device 20B via a network 40, respectively. Further, the operation terminal 10A, the operation terminal 10B, the image processing device 20A, and the image processing device 20B are connected to the management server 30 via the network 40 and an external network 50.

Each of the operation terminal 10A and the operation terminal 10B may be a mobile information processing device having a communication function, examples of which include a tablet information terminal, a mobile information device having a telephone function (called a smartphone), and a notebook personal computer. In the image processing system 1 illustrated in FIG. 1, the operation terminal 10A and the operation terminal 10B are sometimes individually referred to as the operation terminal 10 and collectively referred to as the operation terminals 10, unless otherwise individually designated.

As described in detail below, the operation terminal 10 displays a screen (hereinafter referred to as a service screen) for using a service provided by an image processing device 20, and requests the image processing device 20 to execute service processing in response to an operator's operation. Upon acquisition of information (hereinafter referred to as resource state information) concerning the state of resources held by the image processing device 20 from the image processing device 20, the operation terminal 10 updates the service screen in accordance with the acquired resource state information, and notifies the operator of the state of the resources.

Before using a service, the operator initially sets the service screen by selecting a service to be used and an image processing device 20 that executes service processing. In the initial setting, when the selected image processing device 20 has resources necessary to execute the service processing, service screen information is stored in the operation terminal 10. In order to use a service, the operator selects a service to be used. Then, the service screen corresponding to the selected service is displayed on the operation terminal 10. Although only two operation terminals 10 are illustrated in FIG. 1, the image processing system 1 may include three or more operation terminals 10.

The image processing device 20A and the image processing device 20B are devices having, for example, a scanning function, a printing function, a copying function, a facsimile function, and any other suitable function and configured to execute service processing which implements each of the functions. Each of the image processing device 20A and the image processing device 20B executes service processing in accordance with a request from the operation terminal 10. In the image processing system 1 illustrated in FIG. 1, the image processing device 20A and the image processing device 20B are sometimes individually referred to as the image processing device 20 and collectively referred to as the image processing devices 20, unless otherwise individually designated.

The image processing device 20 holds data (hereinafter referred to as resource data) indicating resources that the image processing device 20 possesses, and transmits the resource data to the operation terminal 10 in accordance with a request from the operation terminal 10 to notify the operator of the operation terminal 10 of the resources that the image processing device 20 holds. The image processing device 20 further transmits resource state information to the operation terminal 10, if necessary, to notify the operator of the state of the resources held by the image processing device 20. The term "resource", as used herein, refers to a physical or virtual entity used to provide a service. Examples of the resource include consumables such as toner, paper, and photoconductors. Other examples of the resource include a communication line, a recording device, a light source, and a power supply. Further examples of the resource include functions which are implementable by the image processing device 20, such as a scanning function and a printing function. In this exemplary embodiment, resource data is used as an example of second resource information.

In a case where a resource is a consumable item, the state of the resource represents at least one of the remaining life of the consumable item, a shortage of the consumable item, and availability of the consumable item. For example, in a case where a resource is a communication line, the state of the resource represents the connection state of the communication line. In a case where a resource is a function which is implementable by the image processing device 20, the state of the resource represents availability of the function. In FIG. 1, two image processing devices 20 are illustrated. The image processing system 1 may include three or more image processing devices 20.

The management server 30 holds data (hereinafter referred to as display data) indicating resources necessary to display a service screen for each service which is executable by the image processing devices 20. Note that items indicated by the display data may be regarded as resources necessary to execute service processing. The items indicated by the display data include items which are required to display a service screen, that is, items which are required to execute the service processing (hereinafter referred to as required items), and items which are not required to display a service screen (hereinafter referred to as optional items). In this exemplary embodiment, display data is used as an example of first resource information.

The network 40 is a communication unit available for the communication of information between the operation terminals 10 and the image processing devices 20, examples of which include a wireless local area network (LAN) that is a network via which data is transmitted and received using wireless communication.

The external network 50 is a communication unit available for the communication of information between devices connected to the network 40 and the management server 30, examples of which include the Internet and a public line.

In the image processing system 1 according to this exemplary embodiment, the operation terminals 10 and the image processing devices 20 may be connected directly to the external network 50, or the management server 30 may be connected directly to the network 40.

Functional Configuration of Operation Terminal

Figure 2:
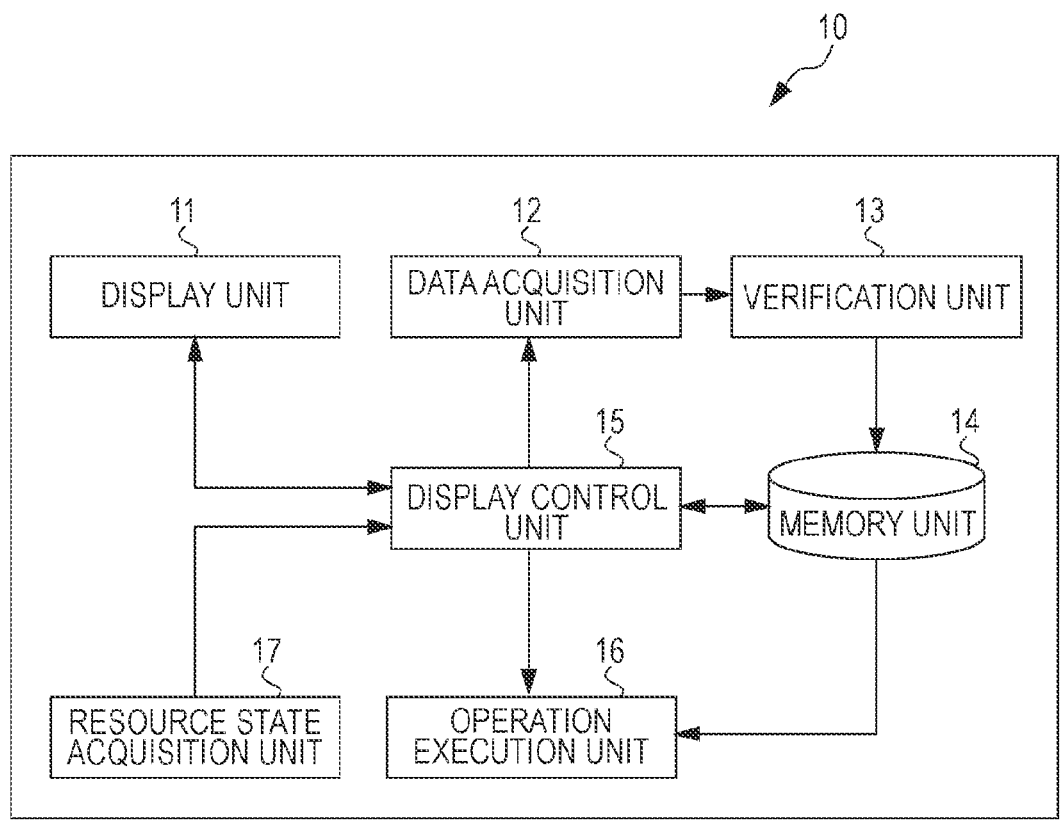
FIG. 2 is a block diagram illustrating an example functional configuration of an operation terminal according to the exemplary embodiment.

A description will now be given of a functional configuration of the operation terminals 10. FIG. 2 is a block diagram illustrating an example functional configuration of the operation terminal 10 according to this exemplary embodiment.

The operation terminal 10 includes a display unit 11 that accepts the operator's operation and that displays various pieces of information to the operator, a data acquisition unit 12 that acquires display data and resource data, a verification unit 13 that checks the display data against the resource data, and a memory unit 14 that stores a list of resources included in the resource data among the resources of the display data. The operation terminal 10 further includes a display control unit 15 that performs control to display an image on the display unit 11 and that performs processing corresponding to the operation accepted by the display unit 11, an operation execution unit 16 that requests the image processing device 20 to transmit resource state information and to execute service processing, and a resource state acquisition unit 17 that acquires the resource state information from the image processing device 20.

The display unit 11 includes a touch panel or the like on which various buttons and various screens such as a service screen are displayed, and is configured to accept the operator's operation and to display various pieces of information to the operator. For example, while the operator performs the initial setting of a service screen, the display unit 11 accepts the operation to select a service name and an image processing device 20 as objects for setting. The display unit 11 further accepts operations such as the operation to activate a service screen and the operation to execute service processing on the service screen.

When the operator performs the initial setting of a service screen, the data acquisition unit 12, which is an example of a resource information acquisition unit, acquires display data from the management server 30 and also acquires resource data from the image processing device 20. Here, the data acquisition unit 12 acquires, from the management server 30, display data corresponding to a service name selected as an object for initial setting on the display unit 11. The data acquisition unit 12 also acquires, from the image processing device 20 selected as an object for initial setting on the display unit 11, resource data held by the selected image processing device 20. The data acquisition unit 12 outputs the acquired display data and resource data to the verification unit 13.

The verification unit 13 checks the display data and resource data acquired from the data acquisition unit 12 against each other, and determines whether or not all the required items of the display data are included in the resource data. In other words, the verification unit 13 determines whether or not the image processing device 20 holds all the resources required to display a service screen, that is, all the resources required to execute the service processing. If it is determined that all the required items of the display data are included in the resource data, the verification unit 13 creates a list of resources included in the resource data among the resources of the display data (hereinafter referred to as the resource list). Then, the verification unit 13 stores the created resource list in the memory unit 14 in association with the service name and the image processing device 20 that have been selected by the operator during the initial setting of the service screen. On the other hand, if it is determined that at least one of the required items of the display data is not included in the resource data, the verification unit 13 does not create a resource list. In this exemplary embodiment, a resource list is used as an example of a list of resources.

The memory unit 14 stores the resource list created by the verification unit 13. The resource list is stored in such a manner that service names and the image processing devices 20 are associated with each other. The memory unit 14 also stores service screen information generated by the display control unit 15 based on the resource list. The resource list is also associated with the service screen information.

The display control unit 15, which is an example of a controller unit, performs control to display an image on the display unit 11, and performs processing corresponding to the operation accepted by the display unit 11. During the initial setting of a service screen, when the operator selects a service name and an image processing device 20 as objects for initial setting on the display unit 11, the display control unit 15 outputs information on the selected service name and image processing device 20 to the data acquisition unit 12. Further, when the verification unit 13 creates a resource list, the display control unit 15 generates service screen information based on the created resource list, and stores the generated service screen information in the memory unit 14. After that, when the operation to activate a service screen is performed on the display unit 11, the display control unit 15 causes a service screen to be displayed on the display unit 11 on the basis of the service screen information stored in the memory unit 14.

Further, when the operation to execute service processing is performed on the service screen displayed on the display unit 11, the display control unit 15 notifies the operation execution unit 16 of the content of the service processing. Furthermore, the display control unit 15 updates the service screen displayed on the display unit 11 in accordance with the resource state information acquired from the resource state acquisition unit 17, and notifies the operator of the state of the resources held by the image processing device 20.

When the operation to activate a service screen is performed using the display unit 11, the operation execution unit 16, which is an example of a request unit, transmits the resource list stored in the memory unit 14 to the image processing device 20, and requests the image processing device 20 to transmit resource state information on the resources shown in the resource list. Further, when the operation to execute service processing is performed on the service screen, the operation execution unit 16 requests the image processing device 20 to execute service processing in accordance with the content of the service processing acquired from the display control unit 15.

The resource state acquisition unit 17 acquires, from the image processing device 20, resource state information on the resources shown in the resource list transmitted from the operation execution unit 16 to the image processing device 20. The resource state acquisition unit 17 outputs the acquired resource state information to the display control unit 15.

Hardware Configuration of Operation Terminal

Figure 3:
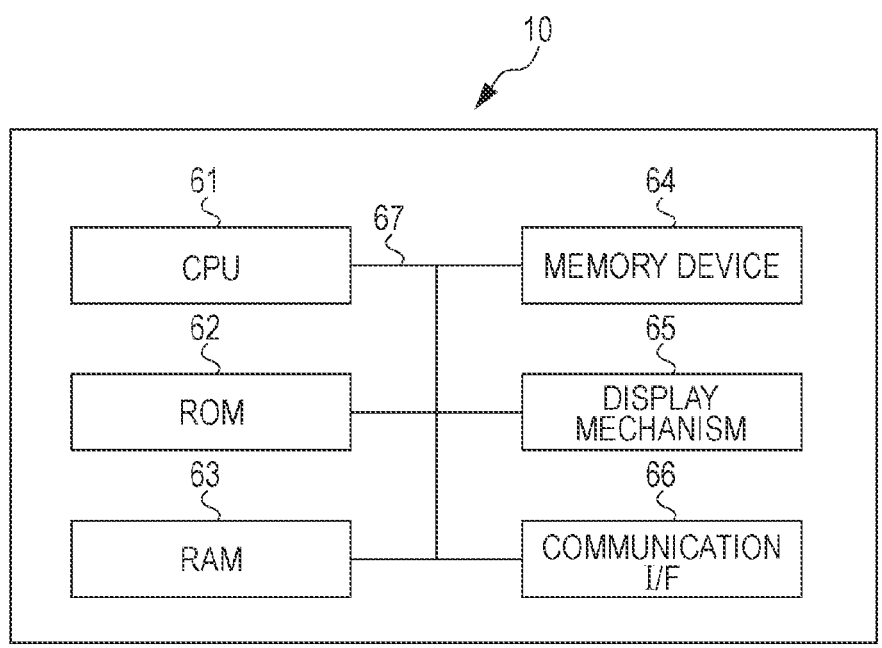
FIG. 3 illustrates an example of a hardware configuration of the operation terminal according to the exemplary embodiment.

A description will now be given of a hardware configuration of the operation terminal 10. FIG. 3 illustrates an example of a hardware configuration of the operation terminal 10 according to this exemplary embodiment.

As illustrated in FIG. 3, the operation terminal 10 includes a central processing unit (CPU) 61 that performs computational processing, a read only memory (ROM) 62 serving as a storage area, a random access memory (RAM) 63, and a memory device 64. The CPU 61 executes software such as an operating system (OS) and a program. The ROM 62 stores various programs and the like, and the RAM 63 is used as a work area or the like during the execution of the various programs and the like using the CPU 61. A program for implementing the functions of the operation terminal 10 illustrated in FIG. 2 is loaded from the ROM 62 to the RAM 63, and the CPU 61 executes processing that is based on the program, thereby implementing the various functions of the operation terminal 10. The memory device 64 is an area for storing input data, output data, and the like in the various programs.

The operation terminal 10 further includes a display mechanism 65 and a communication interface (I/F) 66. The display mechanism 65 includes a touch panel or the like on which various buttons such as a start button and a ten-key pad and various screens are displayed and on which the operation performed by the operator is accepted. The communication I/F 66 is used for communication with an external device. The CPU 61, the ROM 62, the RAM 63, the memory device 64, the display mechanism 65, the communication I/F 66 are connected to one another via a bus 67.

Specifically, in the operation terminal 10, the respective functions of the data acquisition unit 12, the verification unit 13, the display control unit 15, the operation execution unit 16, and the resource state acquisition unit 17 according to this exemplary embodiment are implemented in response to instructions from the CPU 61. The display unit 11 may be implemented by, for example, the display mechanism 65. The memory unit 14 may be implemented by, for example, the memory device 64. Operations, for example, the acquisition of display data and resource data by the data acquisition unit 12, the request of transmission of resource state information by the operation execution unit 16, and the acquisition of resource state information by the resource state acquisition unit 17, are made feasible through the communication I/F 66. The configuration of the operation terminal 10 is an example, and the configuration and arrangement of the individual components may be changed by removing an unnecessary functional unit or adding a new functional unit.

Configuration of Image Processing Device

Figure 4:
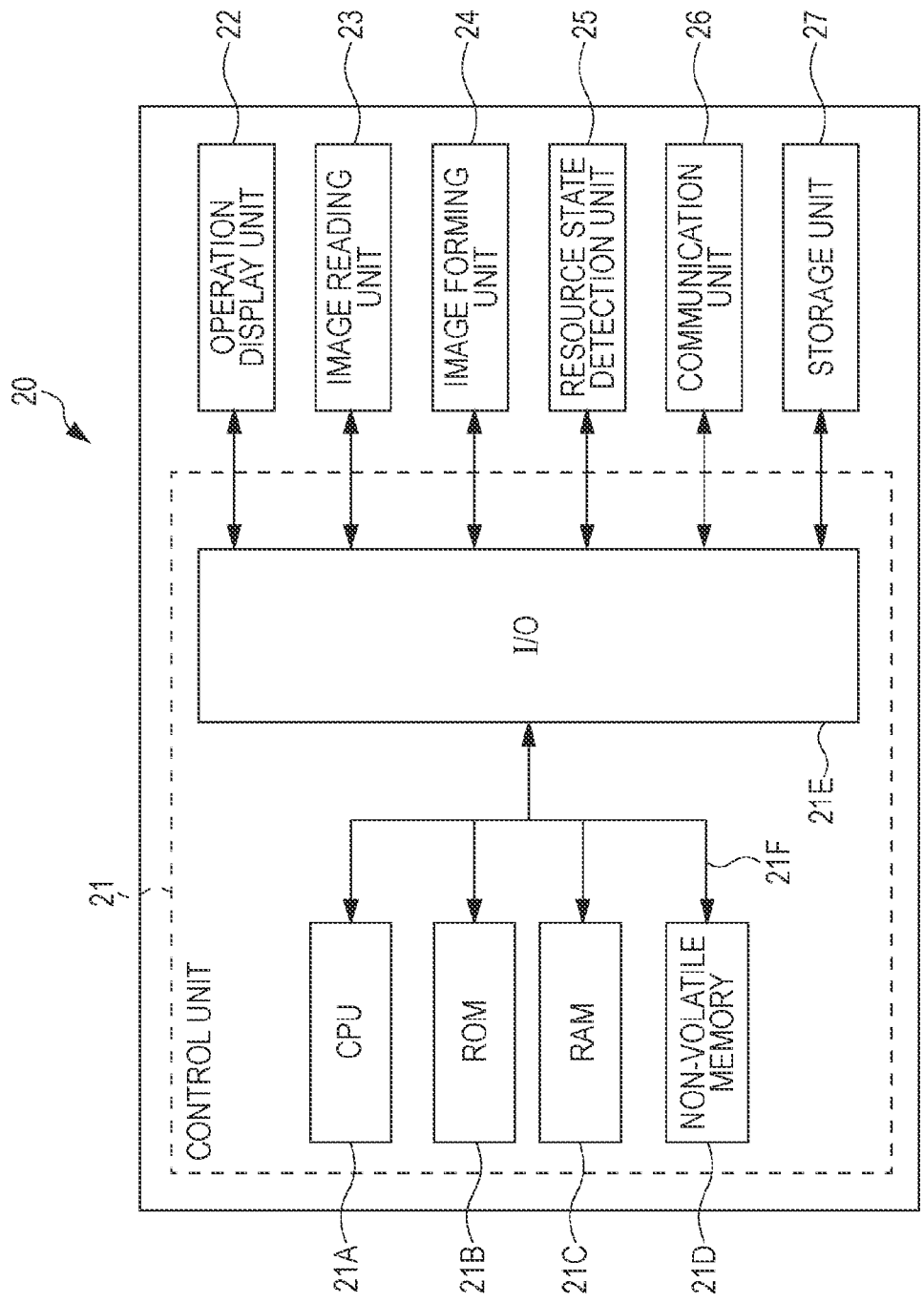
FIG. 4 is a block diagram illustrating an example of a configuration of an image processing device according to the exemplary embodiment.

A description will now be given of a configuration of the image processing devices 20. FIG. 4 is a block diagram illustrating an example configuration of the image processing device 20 according to this exemplary embodiment. As illustrated in FIG. 4, the image processing device 20 includes a control unit 21, an operation display unit 22, an image reading unit 23, an image forming unit 24, a resource state detection unit 25, a communication unit 26, and a storage unit 27. Although not illustrated in FIG. 4, the image processing device 20 further includes a sheet feeder for feeding a sheet from a sheet container, a sheet conveyor for conveying the fed sheet, a sheet discharger for discharging a sheet on which an image has been formed, and other components. The configuration of the image processing device 20 is an example, and the configuration and arrangement of the individual components may be changed by removing an unnecessary functional unit or adding a new functional unit.

The control unit 21, which is an example of a list acquisition unit and a notification unit, is configured as a computer for controlling the overall operation of the image processing device 20 and performing various computational operations. Specifically, the control unit 21 includes a CPU 21A, a ROM 21B storing various programs and the like, a RAM 21C used as a work area during the execution of the various programs and the like, a non-volatile memory 21D that holds memory during no supply of power and that stores various pieces of information, and an input/output interface (I/O) 21E. The CPU 21A, the ROM 21B, the RAM 21C, the non-volatile memory 21D, and the input/output interface 21E are connected to one another via a bus 21F.

The operation display unit 22, the image reading unit 23, the image forming unit 24, the resource state detection unit 25, the communication unit 26, and the storage unit 27 are connected to the input/output interface 21E of the control unit 21. The control unit 21 provides and receives information to and from the operation display unit 22, the image reading unit 23, the image forming unit 24, the resource state detection unit 25, the communication unit 26, and the storage unit 27, and controls the individual components.

For example, in response to the acceptance of a resource data transmission request from the operation terminal 10 via the communication unit 26, the control unit 21 performs control to transmit resource data concerning resources held by the image processing device 20 to the operation terminal 10. In response to the acceptance of a request to execute service processing from the operation terminal 10 via the communication unit 26, the control unit 21 performs control to execute a variety of service processing operations using the hardware resources of the image processing device 20.

Further, in response to the acquisition of a resource list from the operation terminal 10 via the communication unit 26, the control unit 21 registers the acquired information in a table (hereinafter referred to as a resource table) in which the operation terminal 10 as the transmission source and information on the resource list are associated with each other to add a new item to the resource table to update the resource table. Further, the control unit 21 determines, based on information concerning the state of resources detected by the resource state detection unit 25, whether or not the resources shown in the resource list affect service processing. The control unit 21 determines that the resources affect service processing, for example, when sheets of a specific size are not contained in the sheet container, when no toner remains, or when the printing function or the like does not work. If the resources affect service processing, the control unit 21 performs control to transmit resource state information to the operation terminal 10. The control unit 21 also performs control to transmit resource state information to the operation terminal 10 when the resources no longer affect service processing.

The operation display unit 22 includes a touch panel or the like on which various buttons such as a start button and a ten-key pad and various screens such as a setting screen are displayed. With the configuration described above, the operation display unit 22 accepts the operator's operation and displays various pieces of information to the operator.

With the configuration described above, the image reading unit 23 reads an image in a document placed on the image reading unit 23, and generates image information.

The image forming unit 24 may be, for example, a device configured to form an image on a sheet using the electrophotographic system or the inkjet system. For example, in a case where the image forming unit 24 is configured to form an image using the electrophotographic system, the image forming unit 24 includes an image forming section, a fixing device, and so on. The image forming section includes a photoconductor drum, a charging device, an exposure device, a developing device, a transfer device, a cleaning device, and so on.

A brief description will now be given of an image forming operation using the electrophotographic system. The photoconductor drum is charged by the charging device. The exposure device exposes the charged photoconductor drum to light corresponding to an image. Accordingly, an electrostatic latent image corresponding to the image is formed on the photoconductor drum. The developing device develops the electrostatic latent image formed on the photoconductor drum with toner. The transfer device transfers the toner image formed on the photoconductor drum onto a sheet. The fixing device fixes the toner image transferred onto the sheet.

The resource state detection unit 25, which is an example of a detection unit, includes various sensors configured to detect the state of the resources of the image processing device 20. The resource state detection unit 25 detects the state of the resources from the output of the various sensors and the like regularly or at the time when, for example, the control unit 21 acquires a resource list from the operation terminal 10, and outputs information concerning the state of the resources to the control unit 21.

The communication unit 26 is an interface configured to communicate with an external device via a wired or wireless communication line. The communication unit 26 functions as, for example, an interface configured to communicate with a device connected to a network such as a LAN or the Internet. During the implementation of the printing function, the communication unit 26 acquires image information, image forming information used to form an image, and the like from an external device such as a computer via communication. The communication unit 26 also receives a request to transmit resource data, a request to execute service processing, a resource list, and so on from the operation terminal 10.

The storage unit 27, which is an example of a memory unit, includes a memory device such as a hard disk. The storage unit 27 stores various data such as log data, input data and output data in the various programs, and so on. The storage unit 27 also stores a resource table that is based on the resource list transmitted from the operation terminal 10.

Various drives may be connected to the control unit 21. The various drives are devices configured to read or write data from or to computer-readable portable recording media such as a flexible disk, a magneto-optical disk, a compact disc read-only memory (CD-ROM), and a Universal Serial Bus (USB) memory. In a case where various drives are provided, a program may be recorded on a portable recording medium, and the portable recording medium may be loaded and executed using the associated drive.

Process for Initial Setting of Service Screen

A description will now be given of processing that allows the operator to perform the initial setting of a service screen. FIG. 5 is a sequence diagram illustrating an example of a series of processes for the initial setting of a service screen.

First, the display unit 11 of the operation terminal 10 accepts the operation to select a service name and an image processing device 20 as objects for initial setting (step 501). When the display unit 11 accepts the selection of a service name and an image processing device 20, the data acquisition unit 12 requests the management server 30 to transmit display data for the selected service name (step 502), and acquires the display data (step 503). The data acquisition unit 12 further requests the selected image processing device 20 to transmit the resource data held by the image processing device 20 (step 504), and acquires the resource data (step 505).

Then, the verification unit 13 checks the display data and the resource data against each other to determine whether or not all the required items of the display data are included in the resource data (step 506). If it is determined that at least one of the required items of the display data is not included in the resource data, the verification unit 13 does not create a resource list. In this case, the process ends without the generation of service screen information. On the other hand, if it is determined that all the required items of the display data are included in the resource data, as illustrated in FIG. 5, the verification unit 13 creates a resource list, and stores the created resource list in the memory unit 14 (step 507). Then, the display control unit 15 stores and registers service screen information in the memory unit 14 on the basis of the created resource list (step 508), and then the process ends.

Process for Execution of Service Processing

A description will now be given of processing that allows the operator to execute service processing on a service screen. FIG. 6 is a sequence diagram illustrating an example of a series of processes for the execution of service processing.

First, after the image processing device 20 to be operated has been selected using the operation terminal 10, the display unit 11 of the operation terminal 10 accepts the operation to activate a service screen (step 601). When the display unit 11 accepts the operation to activate a service screen, the operation execution unit 16 acquires a resource list for the service screen to be activated from the memory unit 14, and transmits the acquired resource list to the image processing device 20 to be operated (step 602). Further, the display control unit 15 activates the service screen in accordance with the service screen information stored in the memory unit 14, and displays the service screen on the display unit 11 (step 603).

On the other hand, upon acquisition of the resource list from the operation terminal 10, the image processing device 20 adds a new item in which the operation terminal 10 and information on the resource list are associated with each other to update the resource table (step 604). Then, upon detection of the state of the resources (step 605), the image processing device 20 determines whether or not the resources shown in the stored resource list affect service processing (step 606). If the resources affect service processing, as illustrated in FIG. 6, the image processing device 20 transmits resource state information to the operation terminal 10 (step 607). If the resources do not affect service processing, the image processing device 20 does not transmit resource state information.

Then, the display control unit 15 of the operation terminal 10 updates the service screen displayed on the display unit 11 in accordance with the resource state information acquired from the image processing device 20, and notifies the operator that the resources affect service processing (step 608). Then, when the display unit 11 accepts the operation to execute service processing (step 609), the operation execution unit 16 requests the image processing device 20 to execute service processing (step 610), and the image processing device 20 executes service processing (step 611). When the display unit 11 accepts the operation to terminate the service screen (step 612), the operation execution unit 16 requests the image processing device 20 to delete the resource list for the service screen to be terminated (step 613), and the image processing device 20 deletes information on the resource list in the resource table (step 614).

In the process illustrated in FIG. 6, by way of non-limiting example, the image processing device 20 detects the state of resources before the operation to execute service processing is accepted. In an alternative example, service processing may be executed before the state of resources is detected by the image processing device 20.

In the process illustrated in FIG. 6, furthermore, the image processing device 20 determines whether or not the resources affect service processing. The image processing device 20 also determines whether or not the resources no longer affect service processing. Upon detection that the resources no longer affect service processing, the image processing device 20 transmits resource state information indicating that the resources no longer affect service processing to the operation terminal 10. Upon acquisition of the resource state information, the operation terminal 10 updates the service screen to notify the operator that the resources no longer affect service processing. When the execution of service processing is made feasible on the image processing device 20 because the resources no longer affect service processing, the operation terminal 10 accepts the operation to execute service processing from the operator.

Resource Data and Display Data

A description will now be given of the resource data held by the image processing device 20 and the display data held by the management server 30. FIG. 7A illustrates an example of the resource data. FIGS. 7B and 7C illustrate an example of the display data.

The resource data illustrated in FIG. 7A includes scanner information, printing information, facsimile information, toner information, sheet container information, and destination information. The scanner information includes information indicating that the image processing device 20 has a scanner function, and also includes information on the scan resolution supported by the image processing device 20 and the scan paper sizes available for the image processing device 20. The printing information indicates that the image processing device 20 has a printing function, a black and white or monochrome printing function, a color printing function, a scaling printing function which allows a document to be scaled up or down to fit on a page, and an n-up printing function which allows printing of multiple pages per sheet.

The facsimile information indicates that the image processing device 20 has a facsimile function, and further indicates that the image processing device 20 has a facsimile line. The toner information represents information on toner colors available. In the example illustrated in FIG. 7A, the image processing device 20 has (or supports) printing with toner of Y, M, C, and K colors. Here, Y, M, C, and K stand for yellow, magenta, cyan, and black, respectively. The sheet container information represents information on paper sizes available on the image processing device 20. In the example illustrated in FIG. 7A, the image processing device 20 supports printing with paper sizes of A4, A5, B4, and B5. The destination information (facsimile addresses) represents information on destinations used for transmission with the facsimile function.

The display data illustrated in FIG. 7B is display data for a "Simple Copying (A4)" service. The display data illustrated in FIG. 7B indicates that the scanner function, the function available for A4 size scanning, the printing function, the color printing function, toner used for service processing, and A4 size paper are resources necessary for the "Simple Copying (A4)" service.

The display data illustrated in FIG. 7C is display data for a "Standard Copying (A5)" service. The display data illustrated in FIG. 7C indicates that the scanner function, the function available for A5 size scanning, the printing function, the monochrome printing function, the color printing function, the scaling printing function, the n-up printing function, toner used for service processing, and A5 size paper are resources necessary for the "Standard Copying (A5)" service. Note that the color printing function, the scaling printing function, and the n-up printing function are optional items. Thus, even though the image processing device 20 does not have these three functions, the operator is able to use the "Standard Copying (A5)" service if the image processing device 20 has all the other, required items. In this case, however, the operator is not allowed to use the functions corresponding to the optional items that the image processing device 20 does not have.

Screens Displayed on Display Unit

A description will now be given of screens displayed on the display unit 11. FIGS. 8A to 8C illustrate an example of screens displayed on the display unit 11. FIG. 8A illustrates a screen displayed when the display unit 11 accepts the operation to select the image processing device 20 for the initial setting of a service screen or for the execution of service processing. On the screen illustrated in FIG. 8A, the image processing device 20A and the image processing device 20B are displayed as image processing devices 20 that the operator is able to operate using the operation terminal 10. The Internet protocol (IP) address of the image processing device 20A is "11.22.33.01", and the IP address of the image processing device 20B is "11.22.33.02".

FIG. 8B illustrates a screen displayed when the display unit 11 accepts the operation to select a service name for the initial setting of a service screen. The screen illustrated in FIG. 8B is displayed, for example, after an image processing device 20 has been selected on the screen illustrated in FIG. 8A as an object for initial setting. The screen illustrated in FIG. 8B is a screen displayed in response to the selection of the image processing device 20A. On the screen illustrated in FIG. 8B, five service names are displayed as service names available for selection. The list of service names may be stored in the operation terminal 10, or may be acquired by the operation terminal 10 from the image processing device 20 or the management server 30. Display data is prepared for each service name, and is stored in the management server 30. The display unit 11 may be configured to accept the selection of one service name or the selection of multiple service names at the same time on the screen illustrated in FIG. 8B.

FIG. 8C illustrates a screen displayed when the display unit 11 accepts the operation to activate a service screen for the execution of service processing. The screen illustrated in FIG. 8C is displayed, for example, after the image processing device 20 that executes service processing has been selected on the screen illustrated in FIG. 8A. The screen illustrated in FIG. 8C is a screen in response to the selection of the image processing device 20A. On the screen illustrated in FIG. 8C, two service names registered during the initial setting of a service screen as services executable on the image processing device 20A are displayed. When the operator selects one of the service names, the service screen associated with the selected service name is activated and is displayed on the display unit 11.

Resource Table Stored in Image Processing Device

A description will now be given of a resource table stored in the image processing device 20. FIG. 9 illustrates an example of a resource table stored in the image processing device 20. The resource table illustrated in FIG. 9 is read and used when necessary.

In the resource table illustrated in FIG. 9, the operation terminal 10A and the operation terminal 10B are registered as operation terminals 10. In the registration of the operation terminals 10, for example, the IP addresses of the operation terminals 10 are registered. In the illustrated example, "11.22.33.11" is registered as the IP address of the operation terminal 10A, and "11.22.33.12" is registered as the IP address of the operation terminal 10B. In addition, information on the resources for the service name "Simple Copying (A4)" is registered in the operation terminal 10A, and information on the resources for the service name "Standard Copying (A5)" is registered in the operation terminal 10B.

If the image processing device 20 determines that resources affect service processing, the image processing device 20 transmits resource state information to the operation terminal 10 associated with the resources. For example, if shortage of A5 size sheets in the sheet container is detected, the image processing device 20 transmits resource state information indicating a shortage of sheets to the operation terminal 10B. Although one service name for each operation terminal 10 is registered in the resource table illustrated in FIG. 9, multiple service names may be registered for each operation terminal 10.

Process of Operation Terminal for Initial Setting of Service Screen

A description will now be given of the process of the operation terminal 10 for the initial setting of a service screen. FIG. 10 is a flowchart illustrating an example of a processing procedure performed by the operation terminal 10 for the initial setting of a service screen.

First, it is determined whether or not the display unit 11 has accepted the operation for the initial setting of a service screen (step 101). For example, when the operation to select "Image Processing Device 20A" is accepted on the screen illustrated in FIG. 8A, then, the display unit 11 displays the screen illustrated in FIG. 8B, and accepts the selection of a service name. When the display unit 11 also accepts the selection of a service name (YES in step 101), then, the data acquisition unit 12 acquires display data for the selected service name from the management server 30 (step 102). The data acquisition unit 12 further acquires resource data from the selected image processing device 20 (step 103). If the operation for the initial setting of a service screen has not been accepted (NO in step 101), the process flow ends.

Then, the verification unit 13 executes a verification process using the display data and the resource data (step 104). Then, the display control unit 15 determines whether or not a resource list has been created by the verification unit 13 (step 105). If a resource list has been created (YES in step 105), the display control unit 15 stores and registers service screen information in the memory unit 14 on the basis of the created resource list (step 106), and then the process flow ends. If a resource list has not been created, the process flow ends without registering service screen information using the display control unit 15. The details of the processing procedure of the verification process in step 104 will be described below.

Verification Process Using Operation Terminal

Figure 11:
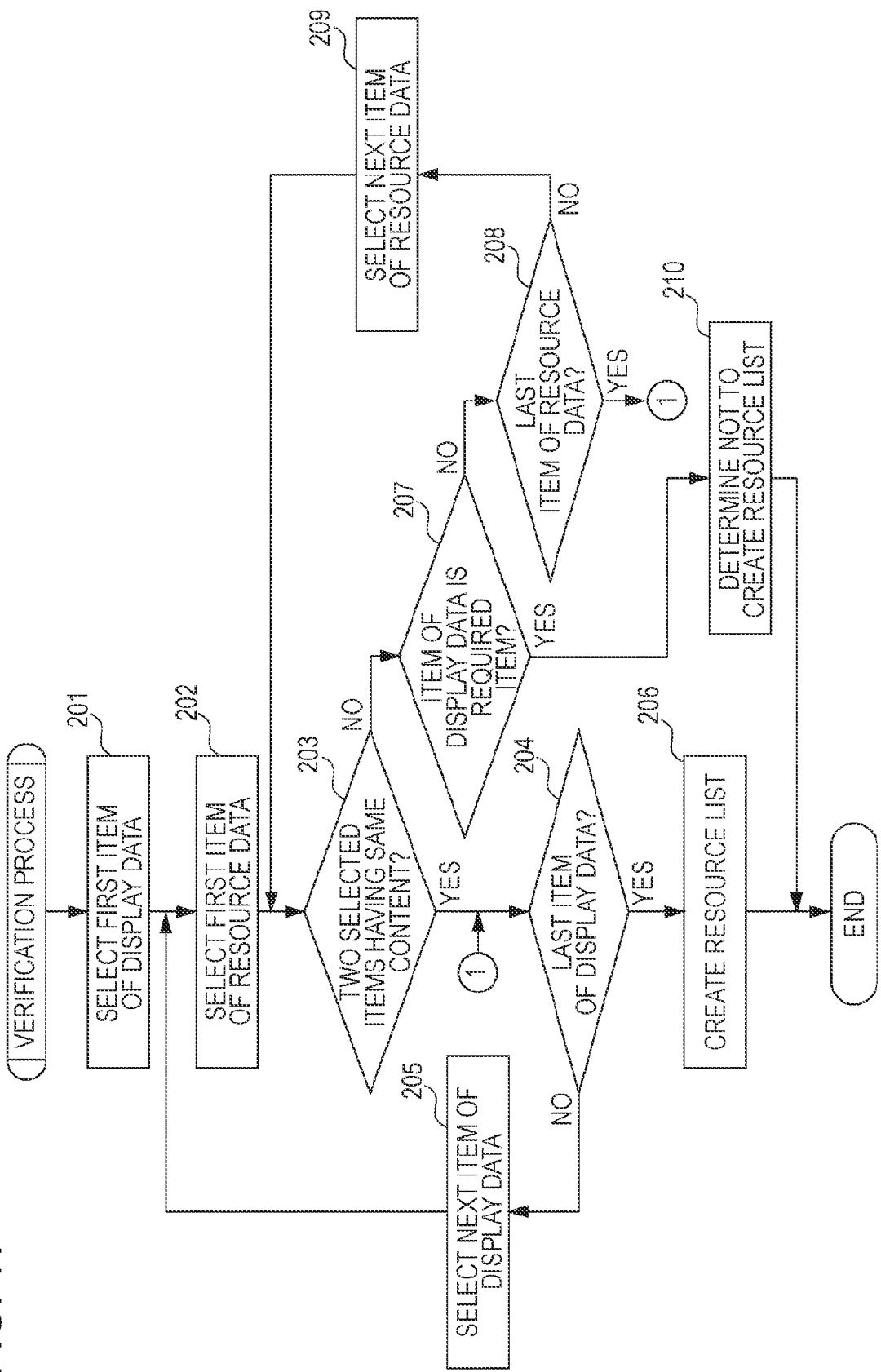
FIG. 11 is a flowchart illustrating an example of the procedure of a verification process performed by a verification unit.

A description will now be given of the verification process performed by the verification unit 13 of the operation terminal 10. FIG. 11 is a flowchart illustrating an example of the procedure of the verification process performed by the verification unit 13. In the process illustrated in FIG. 11, in the initial state, the data acquisition unit 12 has already acquired display data and resource data.

First, the verification unit 13 selects the first item of the display data (step 201). Then, the verification unit 13 selects the first item of the resource data (step 202). Then, the verification unit 13 determines whether or not both selected items have the same content (step 203). For example, the resource data illustrated in FIG. 7A and the display data illustrated in FIG. 7B are checked against each other. If the available paper sizes in the resource data include the paper size (A4) in the display data, the "Scan Size" items of the display data and the resource data have the same content. Furthermore, for example, the "Color Printing" item included in the display data is also present in the resource data, and therefore the "Color Printing" items of the display data and the resource data are determined to have the same content.

If both items have the same content (YES in step 203), then, the verification unit 13 determines whether or not the item of the display data determined in step 203 is the last item of the display data (step 204). If the current item is not the last item (NO in step 204), the verification unit 13 selects the next item of the display data (step 205), and then the process returns to step 202. If the current item is the last item (YES in step 204), this implies that the verification unit 13 has checked all the items included in the display data against the corresponding ones of the resource data. Then, the verification unit 13 creates a resource list (step 206), and then the process flow ends. Here, the verification unit 13 builds a list of items of the display data that are determined to have the same content in step 203 into a resource list.

If a negative determination is made in step 203 (NO in step 203), that is, if the two items have different content, the verification unit 13 determines whether or not the item of the display data determined to have different content is a required item (step 207). If the item in question is not a required item (NO in step 207), the verification unit 13 determines whether or not the item of the resource data determined in step 203 to have different content is the last item of the resource data (step 208). If the item in question is not the last item (NO in step 208), the verification unit 13 selects the next item of the resource data (step 209), and then the process returns to step 203. If the item in question is the last item (YES in step 208), the process proceeds to step 204. Further, if an affirmative determination is made in step 207, that is, if it is determined that the item of the display data determined to have different content is a required item (YES in step 207), the verification unit 13 determines not to create a resource list (step 210), and then the process flow ends.

Process of Operation Terminal for Execution of Service Processing

A description will now be given of processing of the operation terminal 10 for the execution of service processing. FIG. 12 is a flowchart illustrating an example of a processing procedure performed by the operation terminal 10 for the execution of service processing.

First, it is determined whether or not the display unit 11 has accepted the operation to activate a service screen (step 301). Here, for example, after accepting the operation to select "Image Processing Device 20A" on the screen illustrated in FIG. 8A, the display unit 11 displays the screen illustrated in FIG. 8C, and then accepts the operation to activate a service screen. When the display unit 11 accepts the operation to activate a service screen (YES in step 301), then, the operation execution unit 16 transmits a resource list for the selected service screen to the image processing device 20 to request the image processing device 20 to notify the operator of the operation terminal 10 of the resource state (step 302). Further, the display control unit 15 activates the selected service screen and displays the service screen (step 303). If the display unit 11 has not accepted the operation to activate a service screen (NO in step 301), the process flow ends.

Then, the display control unit 15 determines whether or not resource state information has been acquired from the image processing device 20 (step 304). If resource state information has been acquired (YES in step 304), the display control unit 15 updates the service screen in accordance with the acquired resource state information (step 305). After the service screen has been updated or if resource state information has not been acquired (NO in step 304), it is determined whether or not the display unit 11 has accepted the operation to execute service processing (step 306). If the operation to execute service processing has been accepted (YES in step 306), the operation execution unit 16 requests the image processing device 20 to execute service processing (step 307).

After the image processing device 20 has been requested to execute service processing or if the operation to execute service processing has not been accepted (NO in step 306), it is determined whether or not the display unit 11 has accepted the operation to terminate the service screen (step 308). If the operation to terminate the service screen has been accepted (YES in step 308), the operation execution unit 16 requests the image processing device 20 to delete the resource list corresponding to the service screen to be terminated (step 309), and then the process flow ends. If the operation to terminate the service screen has not been accepted (NO in step 308), the process returns to step 304, and the processing of acquiring resource state information and the processing of requesting execution of service processing are subsequently performed.

Resource State Information Transmission Process by Image Processing Device

A description will now be given of processing that allows the image processing device 20 to transmit resource state information to the operation terminal 10. FIG. 13 is a flowchart illustrating an example of the procedure of a resource state information transmission process performed by the image processing device 20.

First, the control unit 21 determines whether or not a resource state notification request has been submitted by the operation terminal 10 (step 401). If a resource state notification request has been submitted (YES in step 401), the control unit 21 acquires a resource list from the operation terminal 10. Then, the control unit 21 adds a new item in which the operation terminal 10 as the transmission source and the resource list are associated with each other to update the resource table (step 402). If a resource state notification request has not been submitted (NO in step 401), the process flow ends.

Then, the control unit 21 determines whether or not information indicating the resource state has been acquired from the resource state detection unit 25 (step 403). If information indicating the resource state has been acquired (YES in step 403), the control unit 21 determines, based on the acquired information indicating the resource state, whether or not the resources shown in the resource list affect service processing (step 404). If the resources affect service processing (YES in step 404), the control unit 21 performs control to transmit resource state information to the operation terminal 10 to notify the operator of the operation terminal 10 that the resources affect service processing (step 405). If information indicating the resource state has not been acquired (NO in step 403) or if the resources do not affect service processing (NO in step 404), the process flow ends without transmitting the resource state from the control unit 21 to the operation terminal 10.

Then, the control unit 21 determines whether or not a request for the deletion of the resource list acquired in step 401 has been submitted by the operation terminal 10 (step 406). If a request for the deletion of the resource list has not been submitted (NO in step 406), the process returns to step 403. If a request for the deletion of the resource list has been submitted (YES in step 406), the control unit 21 deletes information on the resource list in the resource table from the storage unit 27 (step 407), and then the process flow ends.

Further, if it is determined in step 401 that a resource state notification request has been submitted, since a service screen is being displayed on the operation terminal 10, the image processing device 20 executes service processing when, for example, the operation to execute service processing is performed on the operation terminal 10.

Moreover, in step 404, the control unit 21 determines whether or not the resources affect service processing. In this case, the control unit 21 also determines whether or not the resources no longer affect service processing.

Specific Example of Service Screens

A description will now be given of a specific example of service screens displayed on the display unit 11.

Figure 16A:
FIGS. 16A and 16B illustrate an example of a service screen updated by a display control unit in accordance with resource state information.
Figure 16B:

FIG. 14 is a diagram illustrating an example of a relationship between resource data and display data. In the following description, by way of example, the image processing device 20B holds the resource data illustrated in FIG. 14. FIGS. 15A and 15B illustrate an example of service screens displayed on the display unit 11. The service screens illustrated in FIGS. 15A and 15B are displayed based on the resource data and display data illustrated in FIG. 14. FIGS. 16A and 16B illustrate an example of service screens that are updated by the display control unit 15 in accordance with resource state information.

The resource data illustrated in FIG. 14 indicates the resources held by the image processing device 20B. For each resource item, a resource that is held by the image processing device 20B is labeled "Yes", and a resource that is not held by the image processing device 20B is labeled "No". That is, the image processing device 20B does not have a scaling printing function or a facsimile function, and also does not have resources involved in the facsimile function, that is, a facsimile line and destination information (facsimile addresses).

The display data illustrated in FIG. 14 is data for "Simple Copying (A4)", "Standard Copying (A5)", and "Simple Facsimile (A4)" services. For the "Simple Copying (A4)" service, the scanner function, the function available for A4 size scanning, the printing function, the color printing function, toner used for service processing, and A4 size paper are required items. For the "Standard Copying (A5)" service, the scanner function, the function available for A5 size scanning, the monochrome printing function, toner used for service processing, and A5 size paper are required items, whereas the color printing function, the scaling printing function, and the n-up printing function are optional items. For the "Simple Facsimile (A4)" service, the scanner function, the function available for A4 size scanning, the facsimile function, the facsimile line, and the destination information (facsimile addresses) are required items.

Since the resource data illustrated in FIG. 14 includes all the required items of the "Simple Copying (A4)" service, the operator selects the image processing device 20B and performs the initial setting of the "Simple Copying (A4)" service, allowing the registration of information on a service screen for the "Simple Copying (A4)" service illustrated in, for example, FIG. 15A. For example, the operator presses the button labeled "Start Copy" in the service screen displayed on the display unit 11, allowing the image processing device 20B to execute service processing for the "Simple Copying (A4)" service.

Furthermore, the resource data illustrated in FIG. 14 includes all the required items of the "Standard Copying (A5)" service but does not include the scaling printing function, which is an optional item. Thus, the operator selects the image processing device 20B and performs the initial setting of the "Standard Copying (A5)" service, allowing the registration of information on a service screen for the "Standard Copying (A5)" service illustrated in, for example, FIG. 15B. If the image processing device 20B had the scaling printing function, the text "Scaling Printing" would be displayed between, for example, the text "Color Printing" and the text "N-up Printing" on the service screen illustrated in FIG. 15B. Since the image processing device 20B does not have the scaling printing function, the text "Scaling Printing" is not displayed. In this manner, although a service screen is displayed if the resource data includes all the required items, an optional item that is not included as a resource is not displayed on the service screen, so that not all of the functions are available.

Furthermore, the resource data illustrated in FIG. 14 does not include the facsimile function, the facsimile line, and the destination information (facsimile addresses), which are required items of the "Simple Facsimile (A4)" service. Thus, a service screen for the "Simple Facsimile (A4)" service is not displayed, and the operator is not able to use the functions for the "Simple Facsimile (A4)" service using the image processing device 20.

A description will now be given of a service screen that is updated by the display control unit 15 in accordance with resource state information. For example, since the resource data illustrated in FIG. 14 includes all the required items of the "Simple Copying (A4)" service, a service screen is displayed. Here, if no A4 size sheets remain even though the image processing device 20B supports printing with A4 size paper, the functions for the "Simple Copying (A4)" service are not available. In this situation, the image processing device 20B determines, upon detection of no A4 size sheets in the sheet container, that the state of the A4 size paper affects service processing, and transmits resource state information indicating that there are no A4 size sheets remaining to the operation terminal 10. Here, if the image processing device 20B detects the state of resources at the time of acquiring a resource list, the operation terminal 10 acquires resource state information in synchronization with the display of a service screen.

Upon acquisition of resource state information indicating that there are no A4 size sheets remaining from the image processing device 20B, as in the service screen illustrated in FIG. 16A, the display control unit 15 of the operation terminal 10 displays a message such as "The service is not available (out of A4 size paper)" to notify the operator that the image processing device 20B runs out of paper. Additionally, for example, as illustrated in FIG. 16A, the display control unit 15 shows a warning sign indicating "out of service" next to the text "Paper Size: A4" to notify the operator that the service is not available because there are no A4 size sheets. In addition, for example, the display control unit 15 does not show the text "Start Copy", which is displayed on the service screen illustrated in FIG. 15A, on the service screen illustrated in FIG. 16A to reject the operation to execute service processing.

After that, for example, when the operator replenishes the image processing device 20B with A4 size sheets, the image processing device 20 detects the supply of A4 size sheets, and determines that the state of the A4 size paper no longer affects service processing. Then, the image processing device 20 transmits resource state information to the operation terminal 10 to notify the operator that the state of the A4 size paper no longer affects service processing. Upon acquisition of the resource state information from the image processing device 20B, the display control unit 15 updates the screen illustrated in FIG. 16A to obtain the screen illustrated in FIG. 15A. The display control unit 15 updates the service screen, allowing the operator to recognize that the functions for the "Simple Copying (A4)" service have just become available on the image processing device 20.

For example, if there is a shortage of M color toner although the image processing device 20B supports the M color toner, a service screen for the "Simple Copying (A4)" service is displayed; however, the functions for the "Simple Copying (A4)" service are not available. In this case, the image processing device 20B detects the shortage of the M color toner, and transmits resource state information. Upon acquisition of the resource state information indicating the shortage of the M color toner from the image processing device 20B, the display control unit 15 displays, for example, a service screen illustrated in FIG. 16B.

On the service screen illustrated in FIG. 16B, the message "The service is not available (out of M color toner)" is displayed, and a warning sign indicating "out of service" is displayed next to the text "Color Printing" to notify the operator that the service is not available because of a resource related to color printing. In addition, for example, similarly to the service screen illustrated in FIG. 16A, the text "Start Copy" is not displayed on the service screen illustrated in FIG. 16B, and the display unit 11 does not accept the operation to execute service processing. For example, when the operator replenishes the image processing device 20B with M color toner, similarly to the update of the service screen illustrated in FIG. 16A, the service screen illustrated in FIG. 16B is updated to obtain the service screen illustrated in FIG. 15A.

The operator operates the operation terminal 10 in the manner described above, thereby generating a service screen corresponding to resources held by the image processing device 20. Accordingly, the operator is able to use various services. The operator may select a service name and register service screen information at the time of initial setting, and may activate a service screen associated with the service name and execute service processing at the time of using the associated service. To that end, the operator may only be required to select the name of the service that the operator wishes to use and to register service screen information in order to customize, for each operation terminal 10, a screen to be displayed on the operation terminal 10. Furthermore, the operation terminal 10 checks resource data and display data against each other, and does not display a service screen for a service that the image processing device 20 is not able to provide. Moreover, if the image processing device 20 is not able to provide a function or functions for which the image processing device 20 does not hold resources, the operation terminal 10 does not display the function or functions that the image processing device 20 is not able to provide on a service screen. This allows the operator to check the capability of the image processing device 20 to execute service processing and to check the unavailable functions on the service screen.

Furthermore, the operation terminal 10 transmits a resource list to the image processing device 20, encouraging the image processing device 20 to transmit resource state information to the operation terminal 10 in accordance with the state of resources. The operation terminal 10 updates the service screen in accordance with the acquired resource state information, and notifies the operator of the state of the resources of the image processing device 20. This allows the operator to easily understand the state of the resources of the image processing device 20 using the operation terminal 10, compared to the configuration in which the image processing device 20 is not encouraged to transmit the state of the resources to the operation terminal 10.

In the exemplary embodiment described above, by way of non-limiting example, the operation terminal 10 requests the image processing device 20 to delete a resource list in response to the acceptance of the operation to terminate a service screen, and the image processing device 20 deletes information on the resource list. In another example, the image processing device 20 may maintain the information on the resource list until the operator gives an instruction even after the service screen has been completed.

In the exemplary embodiment described above, by way of non-limiting example, the image processing device 20 transmits resource state information on resources corresponding to a service screen activated by the operation terminal 10. In another example, the image processing device 20 may transmit resource state information on resources registered in a resource table to the operation terminal 10 even if a service screen has not been activated on the operation terminal 10. Upon acquisition of the resource state information, for example, the operation terminal 10 may display the acquired information in a window that pops up in front of the screen to notify the operator of the state of the resources.

In the exemplary embodiment described above, by way of non-limiting example, the operation terminal 10 checks resource data and display data against each other during the initial setting of a service screen. In another example, the operation terminal 10 may acquire resource data and display data, and, after the operation to activate a service screen has been performed, the operation terminal 10 may check the acquired resource data and display data against each other and create a resource list.

In the exemplary embodiment described above, by way of non-limiting example, if the image processing device 20 is not able to provide a function or functions, the operation terminal 10 does not display the function or functions that the image processing device 20 is not able to provide in the manner illustrated in FIG. 15B. In another example, the operation terminal 10 may grey out the text "Scaling Printing" on the screen illustrated in FIG. 15B to notify the operator that the scaling printing function is not enabled.

In the exemplary embodiment described above, the management server 30 holds display data. Alternatively, the operation terminal 10 or the image processing device 20 may hold display data.

In the exemplary embodiment described above, by way of non-limiting example, the operation terminal 10 and the image processing device 20 communicate with each other via a wireless LAN as an example of a communication unit. In another example, the operation terminal 10 and the image processing device 20 may communicate with each other using infrared transmission or may communicate with each other via a wired network.

Program

The processes performed by the operation terminal 10 according to the exemplary embodiment described above, are prepared as, for example, a program such as a software application.

Thus, the processes performed by the operation terminal 10 may be implemented as a program for causing a computer to implement a function to acquire first resource information indicating resources used to execute predetermined image processing and second resource information indicating resources held by an image processing device selected as a device that executes the image processing, and a function to generate a screen on which an operation to execute the image processing is accepted in accordance with a resource corresponding to the second resource information among the resources included in the first resource information.

A program according to an exemplary embodiment of the present invention may be provided using a communication unit or may be provided by being stored in a recording medium such as a compact disc read-only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a resource information acquisition unit that acquires first resource information and second resource information, the first resource information indicating resources used to execute predetermined image processing, the second resource information indicating resources held by an image processing device selected as a device that executes the image processing; and
a controller unit that performs control to generate a screen on which an operation to execute the image processing is accepted in accordance with a resource corresponding to the second resource information among the resources included in the first resource information,
wherein the first resource information comprises resources required to execute the predetermined image processing, and
wherein the controller unit performs the control to generate the screen when all the required resources of the first resource information are included in the second resource information acquired from the image processing device.

2. The information processing device according to claim 1, further comprising:
a request unit that transmits a list of resources to the image processing device, the list being a list of resources included in the second resource information among the resources included in the first resource information, in accordance with the resource corresponding to the second resource information among the resources included in the first resource information, and that sends a request to the image processing device to transmit a state of the resources included in the list.

3. The information processing device according to claim 2, wherein the controller unit updates the screen in accordance with the state of the resources included in the list transmitted in response to the request sent by the request unit.

4. The information processing device according to claim 3, wherein
the first resource information includes the required resources and non-required resources,
the required resources being resources required to execute the image processing, the non-required resources being resources not required to execute the image processing, and
in a case where a non-required resource among the non-required resources included in the first resource information matches a resource that is not included in the second resource information, the controller unit performs control to notify an operator that the image processing device does not hold the non-required resource.

5. The information processing device according to claim 3, wherein
the first resource information includes the required resources and non-required resources,
the required resources being resources required to execute the image processing, the non-required resources being resources not required to execute the image processing, and
in a case where a required resource among the required resources included in the first resource information matches a resource that is not included in the second resource information, the controller unit does not generate the screen on which the operation to execute the image processing is accepted.

6. The information processing device according to claim 2, wherein
the first resource information includes the required resources and non-required resources,
the required resources being resources required to execute the image processing, the non-required resources being resources not required to execute the image processing, and
in a case where a non-required resource among the non-required resources included in the first resource information matches a resource that is not included in the second resource information, the controller unit performs control to provide notification that the image processing device does not hold the non-required resource.

7. The information processing device according to claim 2, wherein
the first resource information includes the required resources and non-required resources,
the required resources being resources required to execute the image processing, the non-required resources being resources not required to execute the image processing, and
in a case where a required resource among the required resources included in the first resource information matches a resource that is not included in the second resource information, the controller unit does not generate the screen on which the operation to execute the image processing is accepted.

8. The information processing device according to claim 1, wherein
the first resource information includes the required resources and non-required resources,
the required resources being resources required to execute the image processing, the non-required resources being resources not required to execute the image processing, and
in a case where a non-required resource among the non-required resources included in the first resource information matches a resource that is not included in the second resource information, the controller unit performs control to provide notification that the image processing device does not hold the non-required resource.

9. The information processing device according to claim 1, wherein
the first resource information includes the required resources and non-required resources,
the required resources being resources required to execute the image processing, the non-required resources being resources not required to execute the image processing, and
in a case where a required resource among the required resources included in the first resource information matches a resource that is not included in the second resource information, the controller unit does not generate the screen on which the operation to execute the image processing is accepted.

10. An image processing device comprising:
a detection unit that detects a state of resources held by the image processing device;
a list acquisition unit that acquires a list of resources from an information processing device, the list being a list of resources determined by the information processing apparatus to be held by the image processing device and including all required resources determined by the information processing apparatus to execute predetermined image processing;
a memory unit that stores the list acquired by the list acquisition unit in association with the information processing device; and
a notification unit that notifies the information processing device of information indicating a state of the resources held by the image processing device among the resources used to execute the image processing, in accordance with the list stored in the memory unit, the state of the resources being detected by the detection unit.

11. The image processing device according to claim 10, wherein
in a case where the resources held by the image processing device among the resources used to execute the image processing affect the image processing, the notification unit notifies the information processing device of, as the information, information indicating a state of the resources that affect the image processing.

12. An image processing system comprising:
an image processing device that performs processing on an image; and
an information processing device connected to the image processing device via a communication line,
the information processing device including
a resource information acquisition unit that acquires first resource information and second resource information,
the first resource information indicating resources used to execute predetermined image processing, the second resource information indicating resources held by the image processing device, the image processing device being selected as a device that executes the image processing,
a controller unit that performs control to generate a screen on which an operation to execute the image processing is accepted in accordance with a resource corresponding to the second resource information among the resources included in the first resource information, and
a request unit that transmits a list of resources to the image processing device, the list being a list of resources included in the second resource information among the resources included in the first resource information, in accordance with the resource corresponding to the second resource information among the resources included in the first resource information, and that requests the image processing device to transmit a state of the resources included in the list,
the image processing device including
a detection unit that detects a state of resources held by the image processing device,
a list acquisition unit that acquires the list from the information processing device,
a memory unit that stores the list acquired by the list acquisition unit in association with the information processing device, and
a notification unit that notifies the information processing device of information indicating a state of resources held by the image processing device among the resources used to execute the image processing on the basis of the list stored in the memory unit, the state of the resources being detected by the detection unit,
wherein the first resource information comprises resources required to execute the predetermined image processing, and
wherein the controller unit performs the control to generate the screen when all the required resources of the first resource information are included in the second resource information acquired from the image processing device.

13. A non-transitory computer readable medium storing a program causing a computer to execute a process for performing operations on an image processing device, the process comprising:
acquiring first resource information and second resource information,
the first resource information indicating resources used to execute predetermined image processing, the second resource information indicating resources held by the image processing device, the image processing device being selected as a device that executes the image processing; and
performing control to generate a screen on which an operation to execute the image processing is accepted in accordance with a resource corresponding to the second resource information among the resources included in the first resource information,
wherein the first resource information comprises resources required to execute the predetermined image processing, and
wherein the performing the control to generate the screen comprises performing the control to generate the screen when all the required resources of the first resource information are included in the second resource information acquired from the image processing device.

* * * * *